United States Patent
Ukai et al.

(10) Patent No.: US 11,259,116 B2
(45) Date of Patent: Feb. 22, 2022

(54) SOUND PROCESSING METHOD, REMOTE CONVERSATION METHOD, SOUND PROCESSING DEVICE, REMOTE CONVERSATION DEVICE, HEADSET, AND REMOTE CONVERSATION SYSTEM

(71) Applicant: YAMAHA CORPORATION, Hamamatsu (JP)

(72) Inventors: Satoshi Ukai, Waltham, MA (US); Mikio Muramatsu, Fukuroi (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/720,687

(22) Filed: Dec. 19, 2019

(65) Prior Publication Data

US 2020/0128323 A1    Apr. 23, 2020

Related U.S. Application Data

(63) Continuation of application No. PCT/JP2017/024887, filed on Jul. 7, 2017.

(51) Int. Cl.
| | | |
|---|---|---|
| *H04R 3/02* | (2006.01) | |
| *H04M 9/08* | (2006.01) | |
| *H04R 1/40* | (2006.01) | |
| *H04S 7/00* | (2006.01) | |

(52) U.S. Cl.
CPC ............. *H04R 3/02* (2013.01); *H04M 9/082* (2013.01); *H04R 1/40* (2013.01); *H04S 7/30* (2013.01); *H04S 2400/11* (2013.01); *H04S 2400/15* (2013.01)

(58) Field of Classification Search
CPC . H04R 3/02; H04R 1/40; H04M 9/082; H04S 7/30; H04S 2400/11; H04S 2400/15
See application file for complete search history.

(56) References Cited

U.S. PATENT DOCUMENTS

| | | |
|---|---|---|
| 8,694,326 B2 | 4/2014 | Miyasaka |
| 8,774,398 B2 | 7/2014 | Abe |
| 8,873,764 B2 | 10/2014 | Kuech |
| 9,628,141 B2 | 4/2017 | Wyss |

(Continued)

FOREIGN PATENT DOCUMENTS

| | | |
|---|---|---|
| JP | 2005033771 A | 2/2005 |
| JP | 2008227775 A | 9/2008 |

(Continued)

OTHER PUBLICATIONS

Office Action issued in Japanese Appln. No. 2019-528292 dated Dec. 22, 2020. English machine translation provided.

(Continued)

*Primary Examiner* — Jason R Kurr
(74) *Attorney, Agent, or Firm* — Rossi, Kimms & McDowell LLP (57) ABSTRACT

A sound processing method performs near-end side sound collection processing to collect a sound on a near-end side and generate a sound collection signal, near-end side filter processing to adjust the sound collection signal using transfer characteristics of a far-end side, and near-end side sound emission processing to emit the sound collection signal that has been adjusted, from a speaker on the near-end side.

17 Claims, 7 Drawing Sheets

(56) References Cited

U.S. PATENT DOCUMENTS

| | | |
|---|---|---|
| 2004/0252827 A1 | 12/2004 | Sasaki |
| 2011/0311064 A1* | 12/2011 | Teutsch ................ H04M 9/082 381/26 |
| 2013/0016820 A1 | 1/2013 | Takayama |
| 2015/0030172 A1* | 1/2015 | Gaensler ................. H04R 3/02 381/71.2 |
| 2015/0092950 A1* | 4/2015 | Kim .................... G10L 21/0208 381/66 |
| 2015/0286463 A1 | 10/2015 | Asada |
| 2015/0296290 A1 | 10/2015 | Asada |

FOREIGN PATENT DOCUMENTS

| | | |
|---|---|---|
| JP | 2010183434 A | 8/2010 |
| JP | 2011176638 A | 9/2011 |
| JP | 2012094945 A | 5/2012 |
| JP | 2012151745 A | 8/2012 |
| JP | 2012524434 A | 10/2012 |
| JP | 2013038763 A | 2/2013 |
| JP | 2013055536 * | 3/2013 ............... H04B 3/23 |
| JP | 2013055536 A | 3/2013 |
| JP | 2016502779 A | 1/2016 |
| WO | 2012160778 A1 | 11/2012 |
| WO | 2014069111 A1 | 5/2014 |
| WO | 2014069112 A1 | 5/2014 |

OTHER PUBLICATIONS

International Search Report issued in Intl. Appln. No PCT/JP2017/024887 dated Sep. 26, 2017. English translation provided.

Written Opinion issued in Intl. Appln. No. PCT/JP2017/024887 dated Sep. 26, 2017.

Decision of Refusal mailed in Japanese Appln. No. 2019-528292 dated Jun. 8, 2021. English machine translation provided.

* cited by examiner

SOUND PROCESSING METHOD, REMOTE
CONVERSATION METHOD, SOUND
PROCESSING DEVICE, REMOTE
CONVERSATION DEVICE, HEADSET, AND
REMOTE CONVERSATION SYSTEM

CROSS REFERENCE TO RELATED
APPLICATIONS

The present application is a continuation of International Application No. PCT/JP2017/024887, filed on Jul. 7, 2017, the entire contents of which are incorporated herein by reference.

BACKGROUND OF THE INVENTION

1. Technical Field

The present invention relates to a sound processing method, a remote conversation method, a sound processing device, a remote conversation device, a headset, and a remote conversation system that are used when conversation or the like is performed between a near-end side and a far-end side through communication.

2. Description of the Related Art

International Publication No. 2014/069111 and International Publication No. 2014/069112 disclose a device and a method to reproduce a sound field on a far-end side (a reproduction environment), on a near-end side. In International Publication No. 2014/069111 and International Publication No. 2014/069112, a plurality of speakers and a plurality of microphones are disposed on the far-end side. On the far-end side, the plurality of speakers emit a sound, and the plurality of microphones collect this sound, so that transfer characteristics of the far-end side are obtained.

The device and the method disclosed in International Publication No. 2014/069111 adjust a sound collection signal obtained on the far-end side, by a transfer coefficient, and emit a sound from the plurality of speakers disposed so as to surround a user.

In the device and the method disclosed in International Publication No. 2014/069112, a plurality of microphones and a plurality of speakers are installed so as to surround a user. The device and the method disclosed in International Publication No. 2014/069112 collect a sound of the user by the plurality of microphones disposed so as to surround the user. The device and the method disclosed in International Publication No. 2014/069112 adjust collected sound of the user using a transfer coefficient, and emit the sound from the plurality of speakers disposed so as to surround the user.

In this manner, in International Publication No. 2014/069111 and International Publication No. 2014/069112, a sufficiently large number of microphones and speakers that are able to reproduce a sound field are installed in advance and obtain transfer characteristics. In addition, in International Publication No. 2014/069111 and International Publication No. 2014/069112, when the sound field is reproduced, the same number of speakers as when the transfer characteristics are obtained are disposed at the same positions as when the transfer characteristics are obtained.

However, in the device and the method disclosed in International Publication No. 2014/069111 and International Publication No. 2014/069112, in a case in which conversation is performed between a near-end side and a far-end side, a feeling that a talker on the near-end side is talking on a far-end side is not able to be achieved.

SUMMARY OF THE INVENTION

In view of the foregoing, an object of the present invention is to provide a sound processing method, a remote conversation method, a sound processing device, a remote conversation device, a headset, and a remote conversation system that achieve a feeling that a talker on the near-end side is talking on a far-end side, on the near-end side.

A sound processing method performs near-end side sound collection processing to collect a sound on a near-end side and generates a sound collection signal, near-end side filter processing to adjust the sound collection signal using transfer characteristics of a far-end side, and near-end side sound emission processing to emit the adjusted sound collection signal, from a speaker on the near-end side.

The sound processing method is able to achieve on the near-end side a feeling that a talker on a near-end side is talking on a far-end side.

DETAILED DESCRIPTION OF THE
PREFERRED EMBODIMENTS

Figure 1:
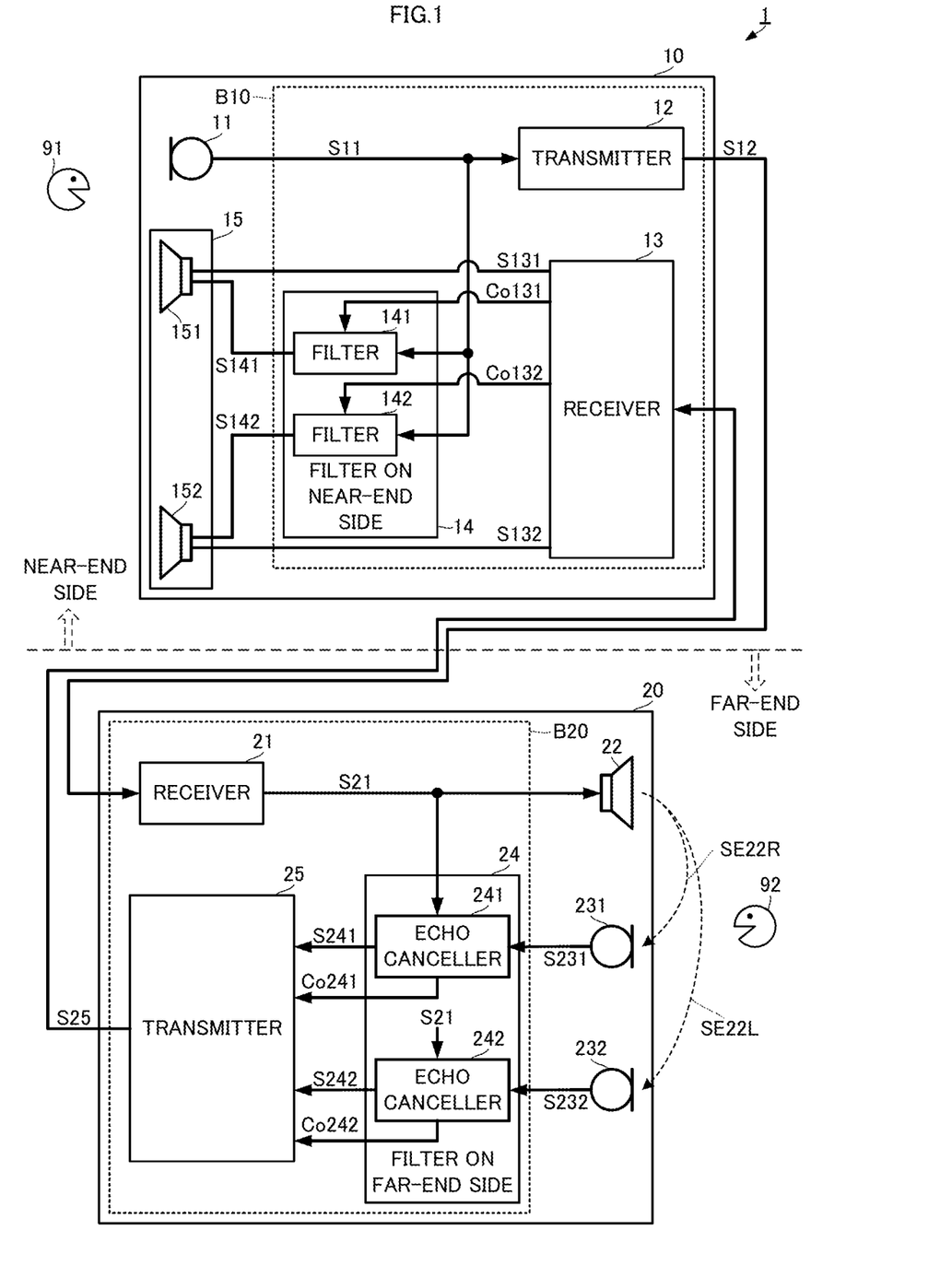
FIG. 1 is a block diagram showing a configuration of a remote conversation device and a remote conversation system according to a first preferred embodiment of the present invention.
Figure 2:
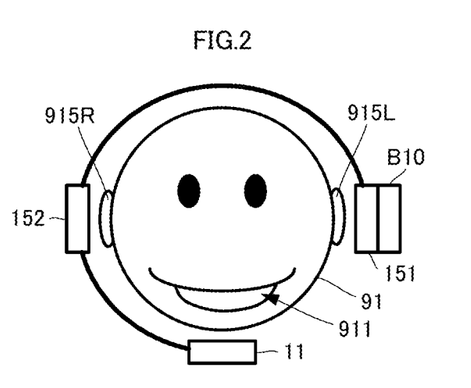
FIG. 2 is a diagram showing an arrangement of a microphone and a speaker on a near-end side.
Figure 3:
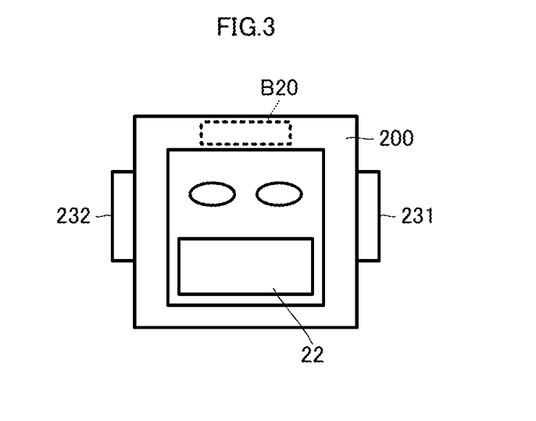
FIG. 3 is a diagram showing an arrangement of a microphone and a speaker on a far-end side.

A remote conversation device, a remote conversation method, and a remote conversation system according to a first preferred embodiment of the present invention will be described with reference to the drawings. FIG. 1 is a block diagram showing a configuration of a remote conversation device and a remote conversation system according to the first preferred embodiment of the present invention. FIG. 2 is a diagram showing an arrangement of a microphone and a speaker on a near-end side. FIG. 3 is a diagram showing an arrangement of a microphone and a speaker on a far-end side.

For example, the remote conversation device of the present invention includes a microphone on a near-end side, a transfer characteristics obtainer, a filter on the near-end side, and a speaker on the near-end side. The microphone on the near-end side obtains a sound on the near-end side, and generates a sound collection signal. The transfer characteristics obtainer obtains transfer characteristics of a far-end side. The filter on the near-end side adjusts the sound collection signal using the transfer characteristics. The speaker on the near-end side emits an audio signal of the far-end side, and the sound collection signal that has been adjusted.

The remote conversation device of this configuration adjusts the sound collection signal of the near-end side using the transfer characteristics of the far-end side, while achieving conversation between the near-end side and the far-end side. As a result, a talker on the near-end side can hear the sound of the self according to the sound on the far-end side, together with the sound of a talker on the far-end side. Accordingly, the remote conversation device is able to achieve a feeling that the talker on the near-end side is talking with the talker on the far-end side, on the far-end side, with a simple configuration on the near-end side.

As shown in FIG. 1, a remote conversation system 1 includes a near-end side conversation device 10 being a conversation device disposed on a near-end side and a far-end side conversation device 20 being a conversation device disposed on a far-end side. The near-end side conversation device 10 corresponds to the "remote conversation device" of the present invention. The near-end side conversation device 10 and the far-end side conversation device 20 perform wireless or wired communication. It is to be noted that a remote conversation referred to in the present invention is not limited to a normal conversation, and may include exchange of sound between remote places, such as a conference between remote places.

The near-end side conversation device 10 includes a microphone 11, a transmitter 12, a receiver 13, a filter 14 on a near-end side, and a speaker 15. The filter 14 on the near-end side includes a filter 141 and a filter 142. The speaker 15 includes a speaker 151 and a speaker 152, and configures a stereo speaker. The transmitter 12, the receiver 13, and the filter 14 on the near-end side configure a signal processor B10. The signal processor B10 is implemented by hardware such as an IC that performs a function of each of the transmitter 12, the receiver 13, and the filter 14 on the near-end side.

As shown in FIG. 2, the microphone 11, the speaker 151, and the speaker 152 configure a headset. The signal processor B10 is attached to the headset, and is connected to the microphone 11, the speaker 151, and the speaker 152.

The microphone 11 is disposed at an approximately central position in a horizontal direction of the headset and at a position on a lower side in a vertical direction of the headset. The microphone 11 is disposed with the center of sound collection directivity directed toward the center of the headset.

The speaker 151 is disposed on a first end in the horizontal direction of the headset, and the speaker 152 is disposed on a second end in the horizontal direction of the headset. In other words, the speaker 151 and the speaker 152 are disposed at positions in line symmetry with respect to a straight line extending in the vertical direction through the microphone 11. The speaker 151 and the speaker 152 are disposed with the center of sound emission directivity directed toward the center of the headset.

When a user 91 on the near-end side wears the headset, the microphone 11 is disposed near the mouth 911 of the user 91. Accordingly, when the user 91 emits a sound, the microphone 11 collects this sound.

The speaker 151 is placed over a left ear 915L of the user 91, and the speaker 152 is placed over a right ear 915R of the user 91. As a result, the user 91 can hear, with the left ear 915L, a sound emitted from the speaker 151, and can hear, with the right ear 915R, a sound emitted from the speaker 152.

The signal processor B10 is attached to the headset, and is connected to the microphone 11, the speaker 151, and the speaker 152.

The microphone 11 collects the sound of the user 91 and generates a sound collection signal S11. The microphone 11 outputs the sound collection signal S11 to the filters 141 and 142 of the filter 14 on the near-end side and the transmitter 12.

The transmitter 12 converts the sound collection signal S11 into a communication signal S12, and transmits the communication signal S12 to a receiver 21 of the far-end side conversation device 20.

The receiver 13 receives a communication signal S25 from the far-end side conversation device 20 to be described later. The receiver 13 demodulates sound emission signals S131 and S132, and filter coefficients Co131 and Co132 from the communication signal S25. Accordingly, the receiver 13 has a function of the "transfer characteristics obtainer" of the present invention. The receiver 13 outputs the sound emission signal S131 to the speaker 151, and outputs the sound emission signal S132 to the speaker 152. The receiver 13 outputs the filter coefficient Co131 to the filter 141, and outputs the filter coefficient Co132 to the filter 142.

It is to be noted that, although the details will be described later, the sound emission signal S131 is an audio signal that has been collected by the microphone 231 of the far-end side conversation device 20 and has been subjected to echo cancellation processing by an echo canceller 241. The sound emission signal S132 is an audio signal that has been collected by the microphone 232 of the far-end side conversation device 20 and has been subjected to the echo cancellation processing by an echo canceller 242. The filter coefficient Co131 is the same as a filter coefficient Co241 of the echo canceller 241, and the filter coefficient Co132 is the same as a filter coefficient Co242 of the echo canceller 241. These filter coefficients Co131, Co132, Co241, and Co242 correspond to the "transfer characteristics" of the present invention.

The filter 141 performs filter processing on the sound collection signal S11, using the filter coefficient Co131. The filter 141 includes an IIR filter, for example, and performs the filter processing by performing a convolution operation with respect to the sound collection signal S11, using the filter coefficient Co131. The filter 141 outputs a sound collection signal (the sound collection signal that has been adjusted) S141 that has been subjected to this filter processing to the speaker 151.

The filter 142 performs the filter processing on the sound collection signal S11, using the filter coefficient Co132. The filter 142 includes an IIR filter, for example, and performs the filter processing by performing the convolution operation with respect to the sound collection signal S11, using the filter coefficient Co132. The filter 142 outputs a sound collection signal (the sound collection signal that has been adjusted) S142 that has been subjected to this filter processing to the speaker 152.

By performing such processing, the sound collection signals S141 and S142 that have been subjected to the filter processing become audio signals according to the transfer characteristics of a sound field on the far-end side.

The speaker 151 emits the sound emission signal S131 and the sound collection signal S141 that has been subjected to the filter processing. The speaker 152 emits the sound emission signal S132 and the sound collection signal S142 that has been subjected to the filter processing.

In this manner, by using the near-end side conversation device 10, the user 91 on the near-end side, while hearing the sound of the self by the transfer characteristics of the sound field on the far-end side, can hear a sound of a user 92 on the far-end side. Accordingly, the user 91 on the near-end side can obtain a feeling as if being present on the far-end side and talking with the user 92 on the far-end side, that is, the realistic sensation of a conversation.

When this configuration is used, it is only necessary to provide one microphone and two speakers on the near-end side, and it is unnecessary to provide on the near-end side a large-scale configuration to achieve the transfer characteristics of the sound field on the far-end side. Accordingly, a realistic conversation between distant places is able to be achieved with a simple configuration.

In such a case, the far-end side conversation device 20 may specifically implement the following configuration and processing, for example.

The far-end side conversation device 20 includes a receiver 21, a speaker 22, a microphone 231, a microphone 232, a filter 24 on the far-end side, and a transmitter 25. The filter 24 on the far-end side includes an echo canceller 241 and an echo canceller 242. The microphone 231 and the microphone 232 configure a stereo microphone. The receiver 21, the filter 24 on the far-end side, and the transmitter 25 configure a signal processor B20. The signal processor B20 is implemented by hardware such as an IC that performs a function of each of the receiver 21, the filter 24 on the far-end side, and a transmitter 25.

As shown in FIG. 3, the speaker 22, the microphone 231, the microphone 232, and the signal processor B20 are mounted in a face shaped robot 200. It is to be noted that a mounting location is not necessarily the face shaped robot 200 as long as at least the speaker 22, the microphone 231, and the microphone 232 are able to be maintained in a predetermined positional relationship. The signal processor B20 is connected to the speaker 22, the microphone 231, and the microphone 232.

The speaker 22 is disposed at an approximately central position in a horizontal direction of the robot 200 and at a position on a lower side in a vertical direction of the robot 200. The speaker 22 is disposed with the center of sound emission directivity directed toward the front surface of the robot 200.

The microphone 231 is disposed on a first end in the horizontal direction of the robot 200, and the microphone 232 is disposed on a second end in the horizontal direction of the robot 200. In other words, the microphone 231 and the microphone 232 are disposed at positions in line symmetry with respect to a straight line extending in the vertical direction through the speaker 22. The microphone 231 and the microphone 232 are disposed with the center of sound collection directivity directed toward the front surface of the robot 200.

In other words, the positional relationship between the speaker 22 and the microphone 231 corresponds to the positional relationship between the microphone 11 and the speaker 151 on the near-end side. Further, the positional relationship between the speaker 22 and the microphone 232 corresponds to the positional relationship between the microphone 11 and the speaker 152 on the near-end side.

The receiver 21 receives a communication signal S12 from the transmitter 12 of the near-end side conversation device 10, and demodulates a sound emission signal S21 on the far-end side. The sound emission signal S21 on the far-end side is the same audio signal as the sound collection signal S11 on the near-end side. The receiver 21 outputs the sound emission signal S21 on the far-end side to the speaker 22 and the echo cancellers 241 and 242. The speaker 22 emits the sound emission signal S21 on the far-end side.

The microphone 231 and the microphone 232 collect sound of the user 92 on the far-end side. In such a case, the microphone 231 collects a sound echo SE22R, and the microphone 232 collects a sound echo SE22L.

The sound echo SE22R is an echo of which the characteristics are determined by the positional relationship between the speaker 22 and the microphone 231, the sound emission directivity of the speaker 22, the sound collection directivity of the microphone 231, and the acoustic characteristics of the far-end side. The sound echo SE22L is an echo of which the characteristics are determined by the positional relationship between the speaker 22 and the microphone 232, the sound emission directivity of the speaker 22, the sound collection directivity of the microphone 232, and the acoustic characteristics of the far-end side. In other words, the characteristics of the sound echo SE22R and the sound echo SE22L are determined by the transfer characteristics of the sound field on the far-end side.

The microphone 231 generates a sound collection signal S231 including collected sound and echo, and outputs the sound collection signal S231 to the echo canceller 241. The microphone 232 generates a sound collection signal S232 including collected sound and echo, and outputs the sound collection signal S232 to the echo canceller 242.

The echo canceller 241 performs the echo cancellation processing on the sound collection signal S231, using known echo cancellation technology. By this processing, the echo canceller 241 reduces the sound echo SE22R included in the sound collection signal S231. The echo canceller 241 outputs a sound collection signal S241 that has been subjected to the echo cancellation processing, to the transmitter 25. In addition, the echo canceller 241 outputs the filter coefficient Co241 used for the echo cancellation processing, to the transmitter 25.

The echo canceller 242 performs the echo cancellation processing on the sound collection signal S232, using known echo cancellation technology. By this processing, the echo canceller 242 reduces the sound echo SE22L included in the sound collection signal S232. The echo canceller 241 outputs a sound collection signal S242 that has been subjected to the echo cancellation processing, to the transmitter 25.

In addition, the echo canceller 242 outputs the filter coefficient Co242 used for the echo cancellation processing, to the transmitter 25.

The transmitter 25 makes a pair of the sound collection signals S241 and S242 and the filter coefficients Co241 and Co241, converts the signals into a communication signal S25, and transmits the communication signal S25 to the receiver 13 of the near-end side conversation device 10.

This sound collection signal S241 is demodulated as a sound emission signal S131 of the near-end side conversation device 10, and the sound collection signal S242 is demodulated as a sound emission signal S132 of the near-end side conversation device 10. In addition, the filter coefficient Co241 is demodulated as a filter coefficient Co131 of the near-end side conversation device 10, and the filter coefficient Co242 is demodulated as a filter coefficient Co132 of the near-end side conversation device 10. Then, the processing of the near-end side conversation device 10 is performed.

By using a remote conversation system 1 with such a configuration, the sound of the user 92 on the far-end side is emitted to the user 91 on the near-end side as a clear sound of which the echo has been cancelled. Accordingly, the user 91 on the near-end side can clearly listen to the sound of the user 92 on the far-end side, while obtaining the realistic sensation of a conversation, such as being present on the far-end side and talking with the user 92 on the far-end side.

When this configuration is used, it is only necessary to provide one speaker and two microphones on the far-end side, and it is unnecessary to provide even on the far-end side a large-scale configuration for achieving the transfer characteristics of the sound field on the far-end side. Accordingly, even as the remote conversation system 1, a realistic conversation between distant places is able to be achieved with a simple configuration.

In addition, in this configuration, the filter coefficient Co241 of the echo canceller 241 on the far-end side is able to be used as the filter coefficient Co131 of the filter 141 on the near-end side, and the filter coefficient Co242 of the echo canceller 242 on the far-end side is able to be used as the filter coefficient Co132 of the filter 142 on the near-end side. Accordingly, without complicated processing, a realistic conversation between distant places is able to be achieved with a simple configuration.

It is to be noted that the filter coefficient Co131 may not be the same as the filter coefficient Co241, and may be set based on the filter coefficient Co241. The filter coefficient Co132 may not be the same as the filter coefficient Co242, and may be set based on the filter coefficient Co241.

In addition, although the present preferred embodiment shows an aspect in which the sound collection signal S11 on the near-end side is adjusted using the filter coefficient, any numerical value that indicates the transfer characteristics of the sound field on the far-end side is able to be used in place of the filter coefficient. Specifically, an impulse response itself, or anything in place of the impulse response, may be used. In a case of an impulse response, on the far-end side, using a speaker and a microphone, the impulse response may be measured, and convolution processing may be performed on a sound collection signal, on the near-end side, using the impulse response.

In addition, the above description shows a case in which the sound is transmitted and received once. However, when a conversation is continued, the sound is transmitted and received a plurality of times. In such a manner that the sound is transmitted and received a plurality of times, the filter coefficients Co241 and Co242 may be obtained from the far-end side conversation device 20 for each transmission and reception, and the filter coefficients Co131 and Co132 of the near-end side conversation device 10 may be updated sequentially according to this transmission and reception. Accordingly, the transfer characteristics of the sound field on the far-end side during a conversation are able to be reproduced more faithfully on the near-end side. Accordingly, the user 91 on the near-end side can implement a conversation with more realistic sensation.

In such a case, data volume to be communicated is able to be reduced by using the filter coefficients Co241 and Co242 of the far-end side, as the transfer characteristics of the sound field on the far-end side. As a result, a time lag of the filter processing in the filters 141 and 142 on the near-end side is able to be reduced. Accordingly, almost without generation of a time lag, the transfer characteristics of the sound field on the far-end side are able to be reproduced on the near-end side, and a conversation with further realistic sensation is able to be implemented.

The above description shows an aspect in which the processing of each of the near-end side conversation device 10 and the remote conversation system 1 is performed for each functional block. However, a method shown in the following flow chart is programmed, and such a program executed by suitable hardware such as an information processor (a CPU, for example) is also able to implement the above conversation.

Figure 4:
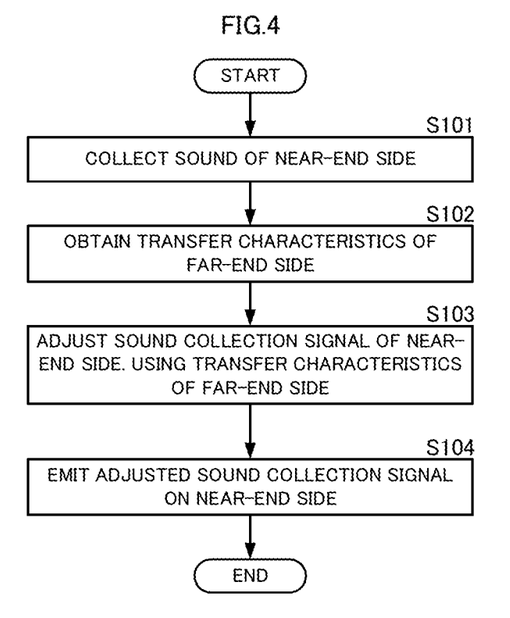
FIG. 4 is a flow chart showing a remote conversation method according to the first preferred embodiment of the present invention.

FIG. 4 is a flow chart showing a remote conversation method executed by the near-end side conversation device according to the first preferred embodiment of the present invention.

The near-end side conversation device collects a sound of a user on a near-end side, and generates a sound collection signal (S101). This processing corresponds to "near-end side sound collection processing."

Figure 5:
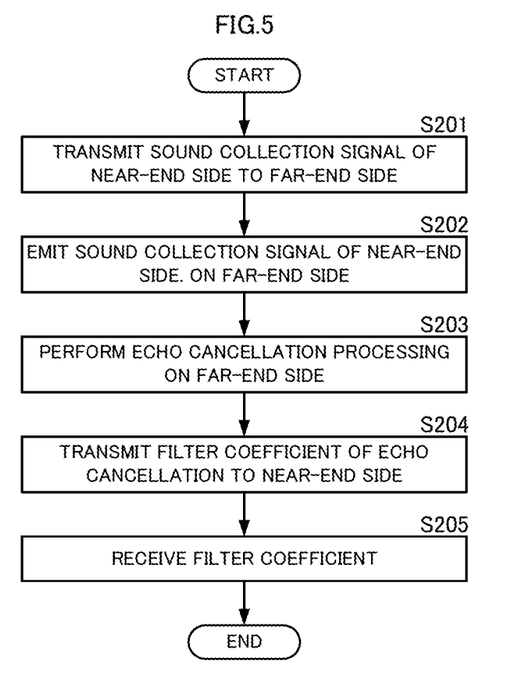
FIG. 5 is a flow chart showing a method of obtaining transfer characteristics.

The near-end side conversation device obtains transfer characteristics of a far-end side (S102). This processing corresponds to "transfer characteristics obtaining processing." As a method of obtaining the transfer characteristics of the far-end side, a method shown in FIG. 5 may be used, for example. FIG. 5 is a flow chart showing the method of obtaining the transfer characteristics.

The near-end side conversation device transmits the sound collection signal of the near-end side to a far-end side conversation device (S201). The far-end side conversation device emits the sound collection signal of the near-end side (S202). This processing corresponds to "far-end side sound emission processing." The far-end side conversation device collects a sound on the far-end side, and generates a sound collection signal of the far-end side. This processing corresponds to "far-end side sound collection processing." The far-end side conversation device performs echo cancellation processing to reduce an echo resulting from the sound collection signal of the near-end side (S203). This processing corresponds to "far-end side filter processing." The far-end side conversation device transmits a filter coefficient of echo cancellation to the near-end side conversation device (S204). The near-end side conversation device receives a filter coefficient of the far-end side, and sets the filter coefficient as the transfer characteristics of the far-end side (S205). By the processing described above, the near-end side conversation device is able to obtain the transfer characteristics of the far-end side.

The near-end side conversation device adjusts the sound collection signal obtained in Step S101 using the transfer characteristics of the far-end side (S103). This processing corresponds to "near-end side filter processing." The near-end side conversation device emits an adjusted sound collection signal, on the near-end side (S104). This processing corresponds to "near-end side sound emission processing."

By using such a remote conversation method, a user on the near-end side, while hearing the sound of the self by the transfer characteristics of the sound field on the far-end side, can achieve a realistic conversation with a user on the far-end side.

It is to be noted that the above description shows an aspect in which, on the near-end side, one microphone and two speakers are disposed, and, on the far-end side, one speaker and two microphones are disposed. However, the number of microphones and the number of speakers are not limited to this example. In such a case, the number of microphones and the number of speakers are preferably not too large. However, as the description given above, two speakers configure a stereo speaker on the near-end side, and two microphones configure a stereo microphone on the far-end side, which is able to obtain realistic sensation and is effective, while the number of microphones and the number of speakers are reduced. In such a case, a few filter coefficients are to be communicated, so that the filter coefficients of the far-end side are transmitted to the near-end side at a high speed. Accordingly, the filter coefficients of the near-end side are able to set almost without delay, which is more effective for the remote conversation system for which real-time performance is important.

In addition, the number of microphones on the near-end side may preferably be the same as the number of speakers on the far-end side, and the number of speakers on the near-end side may preferably be the same as the number of microphones on the far-end side. Further, the arrangement of the speakers with respect to the microphones on the near-end side may preferably be the same as the arrangement of the microphones with respect to the speakers on the far-end side. As a result, the filter coefficient of the far-end side is easily usable as the filter coefficient of the near-end side. Accordingly, the filter coefficient of the near-end side is able to be quickly determined, which is more effective for the remote conversation system for which real-time performance is important.

It is to be noted that, in a case in which the arrangement of the speakers with respect to the microphones on the near-end side is different from the arrangement of the microphones with respect to the speakers on the far-end side, a configuration according to a second preferred embodiment shown below may be used.

Figure 6:
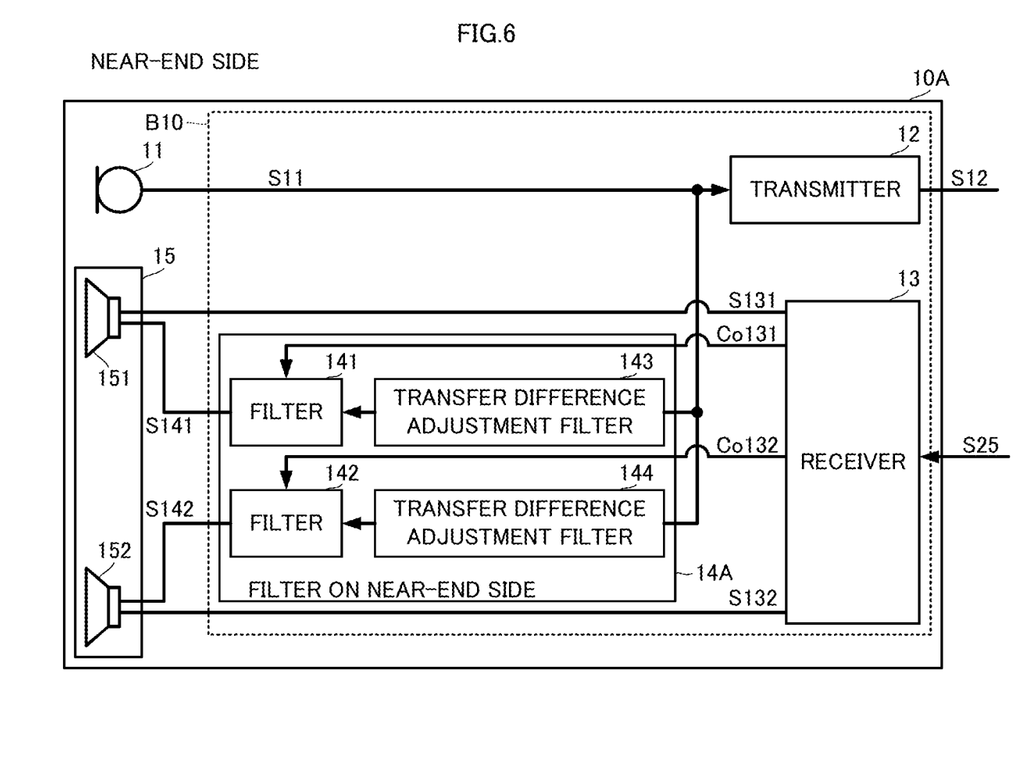
FIG. 6 is a block diagram showing a configuration of a remote conversation device according to a second preferred embodiment of the present invention.

FIG. 6 is a block diagram showing a configuration of a remote conversation device according to a second preferred embodiment of the present invention. As shown in FIG. 6, a near-end side conversation device 10A according to a second preferred embodiment is different in the configuration of a filter 14A on the near-end side from the near-end side conversation device 10 according to the first preferred embodiment. Other configurations of the near-end side conversation device 10A are the same as or similar to the configurations of the near-end side conversation device 10, and a description of the same or similar configurations will be omitted.

The filter 14A on the near-end side includes a filter 141, a filter 142, a transfer difference adjustment filter 143, and a transfer difference adjustment filter 144. The filter 141 and the filter 142 are the same as the filter that configures the filter 14 on the near-end side according to the first preferred embodiment.

The filter coefficient of the transfer difference adjustment filter 143 is set as a value that offsets the difference between the transfer characteristics of the microphone 11 and the speaker 151 on the near-end side and the transfer characteristics of the speaker 22 and the microphone 231 on the far-end side.

The filter coefficient of the transfer difference adjustment filter 144 is set as a value that offsets the difference between the transfer characteristics of the microphone 11 and the speaker 152 on the near-end side and the transfer characteristics of the speaker 22 and the microphone 232 on the far-end side.

The filter coefficient of the transfer difference adjustment filters 143 and 144 is able to be estimated and calculated in advance from the differences between the positional relationship of the microphone 11 and the speakers 151 and 152, the sound collection directivity, and the sound emission directivity in the headset and the positional relationship of the speaker 22 and the microphones 231 and 232, the sound emission directivity, and the sound collection directivity in the robot 200.

The transfer difference adjustment filter 143 performs filter processing on the sound collection signal S11, and outputs the sound collection signal S11 to the filter 141. The filter 141 performs the filter processing on the sound collection signal S11 that has been subjected to the filter processing by the transfer difference adjustment filter 143, and outputs the sound collection signal S11 to the speaker 151.

The transfer difference adjustment filter 144 performs filter processing on the sound collection signal S11, and outputs the sound collection signal S11 to the filter 142. The filter 142 performs the filter processing on the sound collection signal S11 that has been subjected to the filter processing by the transfer difference adjustment filter 144, and outputs the sound collection signal S11 to the speaker 152.

With such a configuration and processing, the near-end side conversation device 10A is able to more faithfully reproduce the transfer characteristics of the sound field on the far-end side. Accordingly, the user on the near-end side can implement a more realistic conversation with a user on the far-end side.

It is to be noted that, although the above preferred embodiment shows an aspect in which the filter coefficient of the far-end side, and the sound collection signal of the far-end side are paired and communicated, the filter coefficient of the far-end side and the sound collection signal of the far-end side may be communicated in another path. In such a case, the filter coefficient of the far-end side may be received quicker than the sound collection signal of the far-end side by the near-end side conversation device.

In addition, although each of the above preferred embodiments shows the remote conversation device that uses only a sound, and the remote conversation system, a more realistic conversation is able to be achieved with the function to capture a video on the far-end side and with the function to reproduce the video on the near-end side.

Further, although each of the above preferred embodiments shows an aspect in which the far-end side conversation device 20 remains still, the far-end side conversation device 20 may be movable. In such a case, filter processing according to a moved position is performed, and a realistic conversation is able to be achieved according to each position.

Moreover, each of the above preferred embodiments shows an aspect in which the near-end side conversation device and the far-end side conversation device have individual functions. However, the functions of the near-end side conversation device and the functions of the far-end side conversation device are also able to be provided in one conversation device. As a result, the similar processing and operational effect are able to be achieved on both the near-end side and the far-end side.

Furthermore, the above description shows an aspect in which a robot or the like is used as the remote conversation device on the far-end side. However, the remote conversation device is not limited to a robot but may be a fixed remote conversation device, and may be a remote conversation device of a portable type, such as a portable communication terminal. For example, the remote conversation device may include a microphone and a speaker that are provided in a predetermined housing, or may include a speaker and a microphone that are provided in a car, for example.

In addition, the configuration of the remote conversation device of a portable type, such as a portable communication terminal and the remote conversation device that is provided in a car is not limited to the remote conversation device on the far-end side and is also able to be applied to a remote conversation device on the near-end side.

Figure 7:
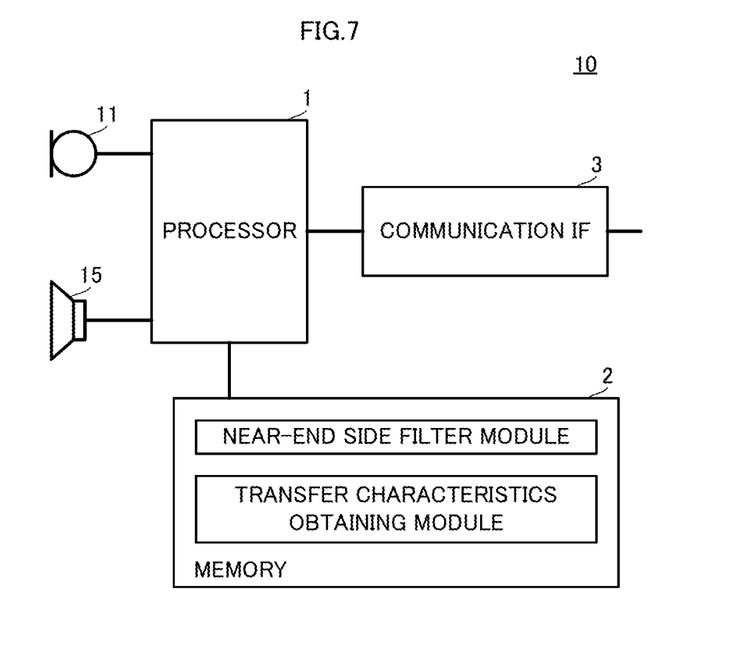
FIG. 7 is a block diagram showing a configuration of a device on the near-end side.

Further, the near-end side conversation device of the above configuration is able to be obtained with the configuration shown in FIG. 7. FIG. 7 is a block diagram showing a configuration of a device on the near-end side.

As shown in FIG. 7, the near-end side remote conversation device 10 includes a processor 1, a memory 2, a communication IF 3, a speaker 11, and a microphone 15. The processor 1 is connected to the memory 2, the communication IF 3, the speaker 11, and the microphone 15.

The memory 2 stores a program such as a filter module on a near-end side, a transfer characteristics obtaining module, or the like, for example. The processor 1 reads and executes the program such as the filter module on the near-end side, the transfer characteristics obtaining module, or the like. As a result, the processing of the signal processor B10 is implemented.

The microphone 11 performs the near-end side sound collection processing, and the speaker 15 performs the near-end side sound emission processing. The communication IF 3 is an interface for communication with an external device such as the far-end side conversation device 20 or the like.

Finally, the foregoing preferred embodiments are illustrative in all points and should not be construed to limit the present invention. The scope of the present invention is defined not by the foregoing exemplary embodiment but by the following claims. Further, the scope of the present invention is intended to include all modifications within the scopes of the claims and within the meanings and scopes of equivalents.

What is claimed is:

1. A remote conversation method comprising:
    performing near-end side sound collection processing to collect a sound on a near-end side and generate a sound collection signal;
    performing near-end side filter processing to adjust the sound collection signal using transfer characteristics of a far-end side by:
        adjusting a filter coefficient on the near-end side to offset a difference between transfer characteristics of the near-end side and the transfer characteristics of the far-end side arising from differences in physical arrangements of at least one speaker and at least one microphone on the near-end side and at least one microphone and at least one speaker on the far-end side; and
        adjusting the sound collection signal of the near-end side by performing a convolution operation using the adjusted filter coefficient; and
    performing near-end side sound emission processing to emit the adjusted sound collection signal and an audio signal of the far-end side, which is different from the sound collection signal of the near-end side, from a speaker on the near-end side,
    wherein the transfer characteristics of the near-end side include an impulse response between at least one speaker and at least one microphone on the near-end side, and
    wherein the transfer characteristics of the far-end side include an impulse response between at least one speaker and at least one microphone on the far-end side.

2. The remote conversation method according to claim 1, further comprising performing transfer characteristics obtaining processing to obtain the transfer characteristics of the far-end side.

3. The remote conversation method according to claim 2, wherein the transfer characteristics obtaining processing obtains the transfer characteristics sequentially, and wherein the near-end side filter processing adjusts the sound collection signal using the transfer characteristics obtained sequentially.

4. The remote conversation method according to claim 1, wherein the near-end side filter processing reduces the sound collection signal based on the audio signal of the far-end side, which is diffracted from the speaker on the near-end side to a microphone on the near-end side, and outputs the reduced sound collection signal and a filter coefficient.

5. A remote conversation method comprising:
    performing far-end side sound emission processing to emit a sound collection signal of a near-end side with a speaker on a far-end side;
    performing far-end side audio signal generation processing to collect a sound on the far-end side and generate an audio signal of the far-end side;
    performing far-end side filter processing to reduce the audio signal of the far-end side based on the sound collection signal of the near-end side, which is diffracted to a microphone on the far-end side, and output the reduced audio signal of the far-end side and a filter coefficient;
    adjusting the filter coefficient to offset a difference between transfer characteristics of the near-end side and the transfer characteristics of the far-end side arising from differences in physical arrangements of at least one speaker and at least one microphone on the near-end side and at least one microphone and at least one speaker on the far-end side; and
    adjusting the sound collection signal of the near-end side by performing a convolution operation using the adjusted filter coefficient,
    wherein the transfer characteristics of the near-end side include an impulse response between at least one speaker and at least one microphone on the near-end side, and
    wherein the transfer characteristics of the far-end side include an impulse response between at least one speaker and at least one microphone on the far-end side.

6. A remote conversation device comprising:
    one or more memories configured to store program instructions; and
    one or more processors configured to execute the stored program instructions to:
        generate a sound collection signal of a near-end side;
        adjust the sound collection signal using transfer characteristics of a far-end side by:
            adjusting a filter coefficient on the near-end side to offset a difference between transfer characteristics of the near-end side and the transfer characteristics of the far-end side arising from differences in physical arrangements of at least one speaker and at least one microphone on the near-end side and at least one microphone and at least one speaker on the far-end side; and
            adjusting the sound collection signal of the near-end side by performing a convolution operation using the adjusted filter coefficient; and
        output the adjusted sound collection signal and an audio signal of the far-end side, which is different from the sound collection signal of the near-end side, wherein the transfer characteristics of the near-end side include an impulse response between at least one speaker and at least one microphone on the near-end side, and wherein the transfer characteristics of the far-end side include an impulse response between at least one speaker and at least one microphone on the far-end side.

7. The remote conversation device according to claim 6, wherein the one or more processors are configured to execute further stored program instructions to obtain the transfer characteristics of the far-end side.

8. The remote conversation device according to claim 7, wherein the transfer characteristics are obtained sequentially: and wherein the one or more processors are configured to execute further stored program instructions to adjust the sound collection signal using the transfer characteristics obtained sequentially.

9. The remote conversation device according to claim 8, wherein the one or more processors are configured to execute further stored program instructions to reduce the sound collection signal based on the audio signal of the far-end side, which is diffracted from the speaker on the near-end side to a microphone on the near-end side, and output the reduced sound collection signal and a filter coefficient.

10. A remote conversation device comprising:
a microphone on a near-end side configured to collect a sound on a near-end side and generate a sound collection signal;
a filter on the near-end side configured to adjust the sound collection signal using transfer characteristics of a far-end side by:
adjusting a filter coefficient on the near-end side to offset a difference between transfer characteristics of the near-end side and the transfer characteristics of the far-end side arising from differences in physical arrangements of at least one speaker and at least one microphone on the near-end side and at least one microphone and at least one speaker on the far-end side; and
adjusting the sound collection signal of the near-end side by performing a convolution operation using the adjusted filter coefficient; and
a speaker on the near-end side configured to emit the adjusted sound collection signal and an audio signal of the far-end side, which is different from the sound collection signal of the near-end side,
wherein the transfer characteristics of the near-end side include an impulse response between at least one speaker and at least one microphone on the near-end side, and
wherein the transfer characteristics of the far-end side include an impulse response between at least one speaker and at least one microphone on the far-end side.

11. A headset comprising the remote conversation device according to claim 10,
wherein the speaker on the near-end side is a stereo speaker including a right speaker and a left speaker: and
wherein the speaker on the near-end side and the microphone on the near-end side are fixed in a predetermined positional relationship.

12. A remote conversation system comprising:
the remote conversation device according to claim 10; and
a far-end side conversation device that is disposed on the far-end side and configured to communicate with the remote conversation device, the far-end side conversation device comprising:
a speaker on the far-end side configured to emit the sound collection signal of the near-end side;
a microphone on the far-end side configured to collect a sound on the far-end side and generate an audio signal of the far-end side; and
a filter on the far-end side configured to reduce the audio signal of the far-end side based on the sound collection signal of the near-end side, which is diffracted from the speaker on the far-end side to the microphone on the far-end side, and output the reduced audio signal of the far-end side and a filter coefficient.

13. The remote conversation system according to claim 12, wherein the filter on the near-end side is configured to adjust the sound collection signal of the near-end side by performing a convolution operation using the filter coefficient.

14. The remote conversation system according to claim 12, wherein the far-end side conversation device is configured to transmit a pair of audio signals of the far-end side and the filter coefficient to the remote conversation device.

15. The remote conversation system according to claim 12, wherein
the speaker on the near-end side includes a first speaker and a second speaker;
a pair of the first speaker and the second speaker configures a stereo speaker;
the microphone on the far-end side includes a first microphone and a second microphone;
a set of the first microphone and the second microphone configures a stereo microphone;
the transfer characteristics corresponding to the first microphone are used for the sound collection signal to be emitted from the first speaker; and
the transfer characteristics corresponding to the second microphone are used for the sound collection signal to be emitted from the second speaker.

16. The remote conversation system according to claim 15,
wherein the first speaker and the second speaker are disposed on opposite sides of a straight line extending in a vertical direction through a position of the microphone on the near-end side: and
wherein the first microphone and the second microphone are disposed on opposite sides of a straight line extending in a vertical direction through a position of the speaker on the far-end side.

17. A remote conversation device comprising:
a speaker on a far-end side configured to emit a sound collection signal of a near-end side;
a microphone on the far-end side configured to collect a sound on the far-end side and generate an audio signal of the far-end side;
a filter on the far-end side configured to reduce the audio signal of the far-end side based on the sound collection signal of the near-end side, which is diffracted to the microphone on the far-end side, and output the reduced audio signal of the far-end side and a filter coefficient; and a filter on the near-end side configured to adjust the sound collection signal of the near-end side using transfer characteristics of the far-end side by:
adjusting the filter coefficient to offset a difference between transfer characteristics of the near-end side and the transfer characteristics of the far-end side arising from differences in physical arrangements of at least one speaker and at least one microphone on the near-end side and at least one microphone and at least one speaker on the far-end side; and
adjusting the sound collection signal of the near-end side by performing a convolution operation using the adjusted filter coefficient,
wherein the transfer characteristics of the near-end side include an impulse response between at least one speaker and at least one microphone on the near-end side, and
wherein the transfer characteristics of the far-end side include an impulse response between at least one speaker and at least one microphone on the far-end side.

* * * * *